(12) United States Patent
Ono

(10) Patent No.: US 6,609,152 B1
(45) Date of Patent: Aug. 19, 2003

(54) SYSTEM FOR AVOIDING THE ASSIGNMENT OF DUPLICATE MAC ADDRESSES TO NETWORK INTERFACE DEVICES

(75) Inventor: Shinichi Ono, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/431,265

(22) Filed: Nov. 1, 1999

(30) Foreign Application Priority Data

Nov. 2, 1998 (JP) .......................................... 10-325841

(51) Int. Cl.$^7$ .......................................... G06F 15/177
(52) U.S. Cl. .......................................... 709/222; 714/2
(58) Field of Search .......................... 709/220–222, 709/245, 250, 200; 700/95; 713/1; 710/9; 714/1–2

(56) References Cited

U.S. PATENT DOCUMENTS

| | | | |
|---|---|---|---|
| 5,594,900 A | * | 1/1997 | Cohn et al. .................. 707/202 |
| 5,841,991 A | * | 11/1998 | Russell ........................ 709/221 |
| 6,363,423 B1 | * | 3/2002 | Chiles et al. ............... 709/224 |

* cited by examiner

*Primary Examiner*—Andrew Caldwell
(74) *Attorney, Agent, or Firm*—Fitzpatrick, Cella, Harper & Scinto

(57) ABSTRACT

A MAC address database server assigns a unique MAC address to a network interface device connected to the MAC address database server via a network. The MAC address database server includes a storage device for storing a MAC address file including multiple MAC addresses. When a MAC address is to be assigned to a network interface device, the MAC address database server reads out one MAC address from the MAC address file and transmits the MAC address to the network interface device. When the MAC address database server receives a notification that the transmitted MAC address has been successfully assigned to the network interface device, all of the addresses in the MAC address file except for the transmitted MAC address are rewritten to a temporary MAC address file. The temporary MAC address file may be stored on the same storage device as the MAC address file or on an external storage device. Then the MAC address database server deletes the transmitted MAC address from the MAC address file. If the MAC address file is ever damaged, the temporary MAC address file is copied to the MAC address file.

14 Claims, 4 Drawing Sheets

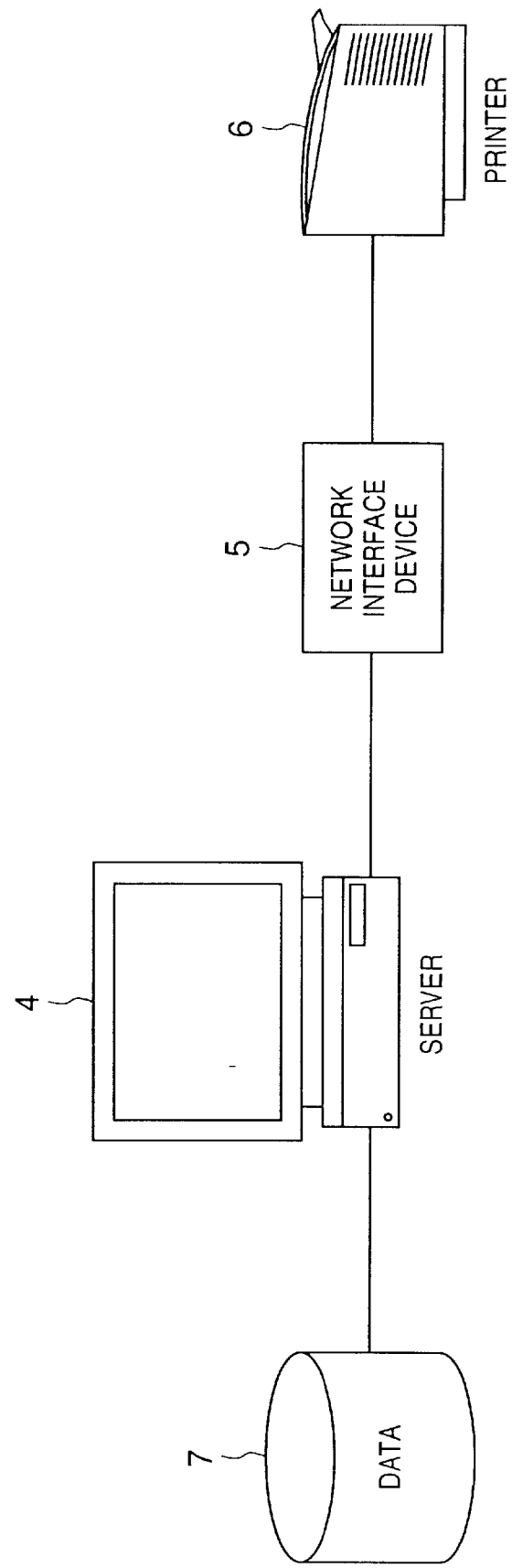

ized to it. More specifically, MAC addresses to a network interface device

SYSTEM FOR AVOIDING THE ASSIGNMENT OF DUPLICATE MAC ADDRESSES TO NETWORK INTERFACE DEVICES

BACKGROUND OF THE INVENTION

1. Field of the Invention

The present invention relates to an MAC address (Media Access Control address) management apparatus, MAC address management system, MAC address management method, and storage medium and, more particularly, to an MAC management apparatus and MAC address management system for assigning an MAC address serving as an identification number unique to a network interface device, to the network interface device for connecting various peripheral devices (e.g., a printer, copying machine, FAX, and scanner) to a computer network, MAC address management method applied to the MAC address management apparatus, and storage medium storing a program for executing the MAC address management method.

2. Description of the Related Art

In manufacturing a network interface device, an MAC address serving as an identification number unique to the device is conventionally assigned to it. More specifically, MAC address information is supplied from a database server for managing MAC addresses to a network interface device having undergone product inspection via a network or manufacturing interface port, and written in the ROM of the network interface device. Upon completion of the write, the database server deletes the supplied MAC address from the storage medium of the database server in order to prevent double use of the MAC address by another device.

However, the conventional MAC address assignment management method suffers the following problems.

Since the MAC address is a number unique to a device and must not be doubly used by another device, assignment of the MAC address must be strictly managed. As one management method, a backup of a file storing the MAC address is inhibited to avoid double use of the MAC address. However, when the backup is inhibited, and the file storing the MAC address is damaged due to any reason to disable any read, all MAC addresses stored in the file cannot be used.

In this case, if not all but even some MAC addresses are to be used, a great deal of labor is spent for verification of MAC addresses which have already been used by manufactured network interface devices, and recovery of the file storing MAC addresses.

SUMMARY OF THE INVENTION

The present invention has been made to overcome the conventional drawbacks, and has as its object to provide an MAC address management apparatus, MAC address management system, and MAC address management method, and storage medium capable of safely and reliably assigning an MAC address to a network interface device.

To achieve the above object, an MAC address management apparatus defined in claim 1 for assigning an MAC address serving as an identification number unique to a network interface device to the network interface device to be connected to a network, comprises MAC address storage means for storing an MAC address file storing a plurality of MAC addresses and a temporary MAC address file, transmission means for reading out one MAC address from the MAC address file and transmitting the MAC address to the network interface device in assigning an MAC address to the network interface device, reception means for receiving an MAC address write completion notification from the network interface device, rewrite means for rewriting, in the temporary MAC address file, MAC addresses of the MAC address file except for the MAC address transmitted to the network interface device upon reception of the MAC address write completion notification, and delete means for deleting the MAC address transmitted to the network interface device from the MAC address file.

To achieve the above object, the MAC address management apparatus defined in claim 2 is the MAC address management apparatus defined in claim 1, and further comprises copy means for copying data stored in the temporary MAC address file to the MAC address file when an abnormality is determined to occur in the MAC address file.

To achieve the above object, an MAC address management apparatus defined in claim 3 for assigning an MAC address serving as an identification number unique to a network interface device to the network interface device to be connected to a network, comprises MAC address storage means for storing an MAC address file storing a plurality of MAC addresses, external storage means for storing a temporary MAC address file in an external storage device connected to the MAC address management apparatus, transmission means for reading out one MAC address from the MAC address file and transmitting the MAC address to the network interface device in assigning an MAC address to the network interface device, reception means for receiving an MAC address write completion notification from the network interface device, rewrite means for controlling to rewrite, in the temporary MAC address file of the external storage device, MAC addresses of the MAC address file except for the MAC address transmitted to the network interface device upon reception of the MAC address write completion notification, and delete means for deleting the MAC address transmitted to the network interface device from the MAC address file.

To achieve the above object, the MAC address management apparatus defined in claim 4 is the MAC address management apparatus defined in claim 3, and further comprises copy means for copying data stored in the temporary MAC address file of the external storage device to the MAC address file when an abnormality is determined to occur in the MAC address file.

To achieve the above object, an MAC address management system defined in claim 5 comprises a network interface device to be connected to a network, and an MAC address management apparatus for assigning an MAC address serving as an identification number unique to the network interface device, the MAC address management apparatus having MAC address storage means for storing an MAC address file storing a plurality of MAC addresses and a temporary MAC address file, transmission means for reading out one MAC address from the MAC address file and transmitting the MAC address to the network interface device in assigning an MAC address to the network interface device, reception means for receiving an MAC address write completion notification from the network interface device, rewrite means for rewriting, in the temporary MAC address file, MAC addresses of the MAC address file except for the MAC address transmitted to the network interface device upon reception of the MAC address write completion notification, and delete means for deleting the MAC address transmitted to the network interface device from the MAC address file, and the network interface device having MAC address reception means for receiving the assigned MAC address from the MAC address management apparatus, write/ storage means for writing and storing the MAC address, and write completion notification transmission means for transmitting the MAC address write completion notification upon completion of a write of the MAC address.

To achieve the above object, an MAC address management system defined in claim 6 comprises a network interface device to be connected to a network, and an MAC address management apparatus for assigning an MAC address serving as an identification number unique to the network interface device, the MAC address management apparatus having MAC address storage means for storing an MAC address file storing a plurality of MAC addresses, external storage means for storing a temporary MAC address file in an external storage device connected to the MAC address management apparatus, transmission means for reading out one MAC address from the MAC address file and transmitting the MAC address to the network interface device in assigning an MAC address to the network interface device, reception means for receiving an MAC address write completion notification from the network interface device, rewrite means for controlling to rewrite, in the temporary MAC address file of the external storage device, MAC addresses of the MAC address file except for the MAC address transmitted to the network interface device upon reception of the MAC address write completion notification, and delete means for deleting the MAC address transmitted to the network interface device from the MAC address file, and the network interface device having MAC address reception means for receiving the assigned MAC address from the MAC address management apparatus, write/ storage means for writing and storing the MAC address, and write completion notification transmission means for transmitting the MAC address write completion notification upon completion of a write of the MAC address.

To achieve the above object, an MAC address management method defined in claim 7 and applied to an MAC address management apparatus having storage means for storing an MAC address file storing a plurality of MAC addresses and a temporary MAC address file, comprises the transmission step of controlling to read out one MAC address from the MAC address file and transmit the MAC address to a network interface device in assigning an MAC address to the network interface device to be connected to a network, the reception step of controlling to receive an MAC address write completion notification from the network interface device, the rewrite step of controlling to rewrite, in the temporary MAC address file, MAC addresses of the MAC address file except for the MAC address controlled to be transmitted to the network interface device, and the delete step of controlling to delete the MAC address transmitted to the network interface device from the MAC address file.

To achieve the above object, the MAC address management method defined in claim 8 is the MAC address management method defined in claim 7, and further comprises the copy step of controlling to copy data stored in the temporary MAC address file to the MAC address file when an abnormality is determined to occur in the MAC address file.

To achieve the above object, an MAC address management method defined in claim 9 and applied to an MAC address management apparatus having storage means for storing an MAC address file storing a plurality of MAC addresses, comprises the transmission step of controlling to read out one MAC address from the MAC address file and transmit the MAC address to a network interface device in assigning an MAC address to the network interface device to be connected to a network, the reception step of controlling to receive an MAC address write completion notification from the network interface device, the rewrite step of controlling to rewrite MAC addresses of the MAC address file except for the MAC address controlled to be transmitted to the network interface device, in a temporary MAC address file stored in an external storage device connected to the MAC address management apparatus, and the delete step of controlling to delete the MAC address transmitted to the network interface device from the MAC address file.

To achieve the above object, the MAC address management method defined in claim 10 is the MAC address management method defined in claim 9, and further comprises the copy step of copying data stored in the temporary MAC address file of the external storage device to the MAC address file when an abnormality is determined to occur in the MAC address file.

To achieve the above object, a computer-readable storage medium defined in claim 11 which stores an MAC address management program for controlling an MAC address management apparatus having storage means for storing an MAC address file storing a plurality of MAC addresses and a temporary MAC address file, comprises codes of the transmission step of controlling to read out one MAC address from the MAC address file and transmit the MAC address to a network interface device in assigning an MAC address to the network interface device to be connected to a network, the reception step of controlling to receive an MAC address write completion notification from the network interface device, the rewrite step of controlling to rewrite, in the temporary MAC address file, MAC addresses of the MAC address file except for the MAC address controlled to be transmitted to the network interface device, and the delete step of controlling to delete the MAC address transmitted to the network interface device from the MAC address file.

To achieve the above object, the storage medium defined in claim 12 is the storage medium defined in claim 11, and further comprises a code of the copy step of controlling to copy data stored in the temporary MAC address file to the MAC address file when an abnormality is determined to occur in the MAC address file.

To achieve the above object, a computer-readable storage medium defined in claim 13 which stores an MAC address management program for controlling an MAC address management apparatus having storage means for storing an MAC address file storing a plurality of MAC addresses, comprises codes of the transmission step of controlling to read out one MAC address from the MAC address file and transmit the MAC address to a network interface device in assigning an MAC address to the network interface device to be connected to a network, the reception step of controlling to receive an MAC address write completion notification from the network interface device, the rewrite step of controlling to rewrite MAC addresses of the MAC address file except for the MAC address controlled to be transmitted to the network interface device, in a temporary MAC address file stored in an external storage device connected to the MAC address management apparatus, and the delete step of controlling to delete the MAC address transmitted to the network interface device from the MAC address file.

To achieve the above object, the storage medium defined in claim 14 is the storage medium defined in claim 13, and further comprises a code of the copy step of copying data stored in the temporary MAC address file of the external storage device to the MAC address file when an abnormality is determined to occur in the MAC address file.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view showing a network interface device, MAC address database server, and the like according to the second embodiment of the present invention.

DETAILED DESCRIPTION OF THE PREFERRED EMBODIMENTS

Preferred embodiments of the present invention will be described below with reference to the accompanying drawings.

First Embodiment

Figure 3:
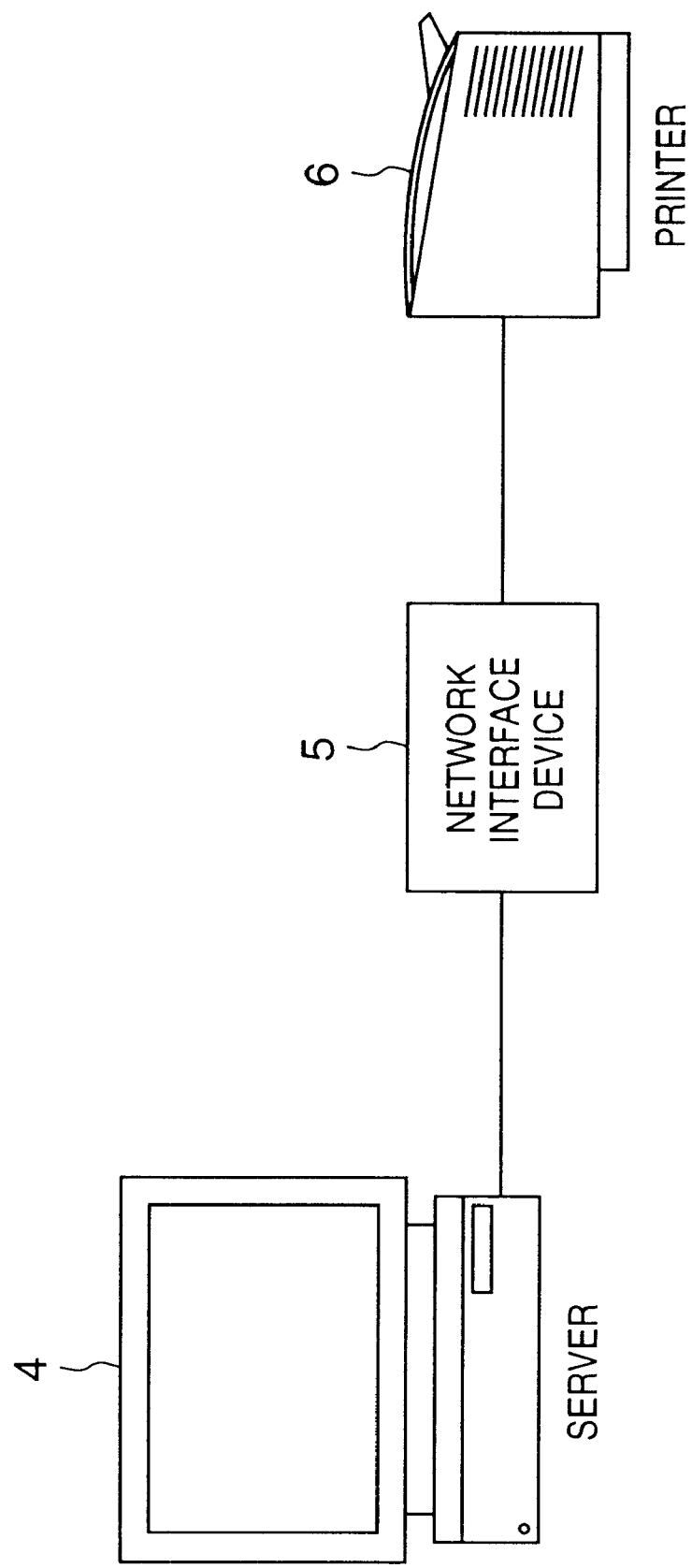
FIG. 3 is a view showing a network interface device, MAC address database server, and the like according to the first embodiment of the present invention.

FIG. 3 is a view showing a network interface device, MAC address database server, and the like according to the first embodiment of the present invention.

In FIG. 3, reference numeral 5 denotes a network interface device; 4, an MAC address database server (to be referred to as a server) for supplying an MAC address to the network interface device 5; and 6, a printer connected to the network interface device 5. Note that the network interface device 5 may be incorporated in the printer 6.

Figure 1:
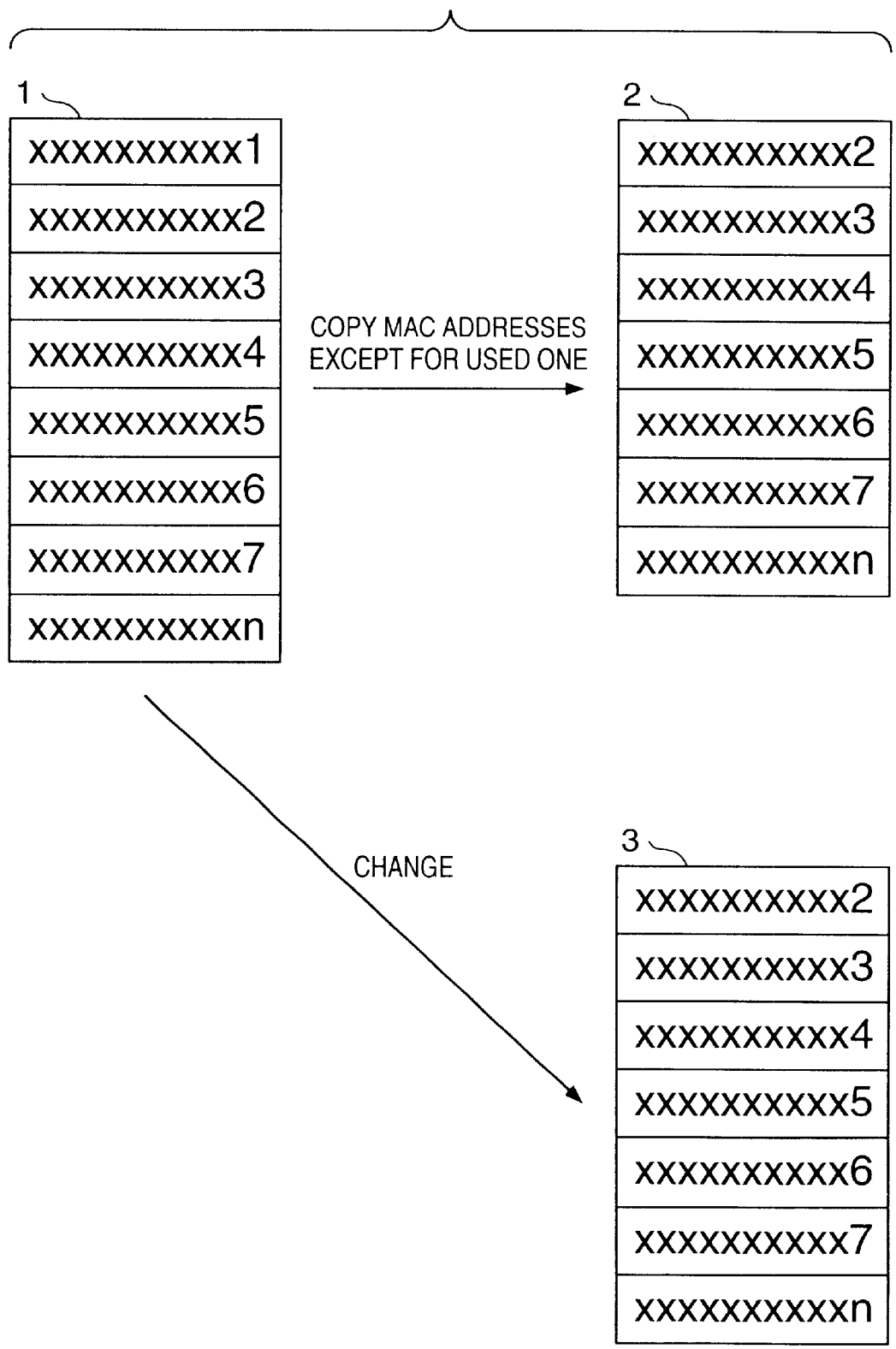
FIG. 1 is a view showing the structures of various MAC address files according to the present invention.

FIG. 1 is a view showing the structures of various MAC address files according to the present invention.

In FIG. 1, reference numeral 1 denotes an MAC address file which is stored in a storage medium (not shown) in the server 4, and stores all MAC addresses to be assigned to respective network interface devices; 2, a temporary MAC address file which is stored in the storage medium of the server 4, and stores all remaining MAC addresses, except for an MAC address supplied to the network interface device 5, that are read out from the MAC address file 1 after the MAC address is supplied to the network interface device 5; and 3, an MAC address file which is made up of remaining MAC address files from the MAC address file 1 except for the MAC address supplied to the network interface device 5, and has the same storage contents as those of the temporary MAC address file 2. Assume that an MAC address "xxxxxxxxx1" is supplied to the network interface device 5.

Figure 2:
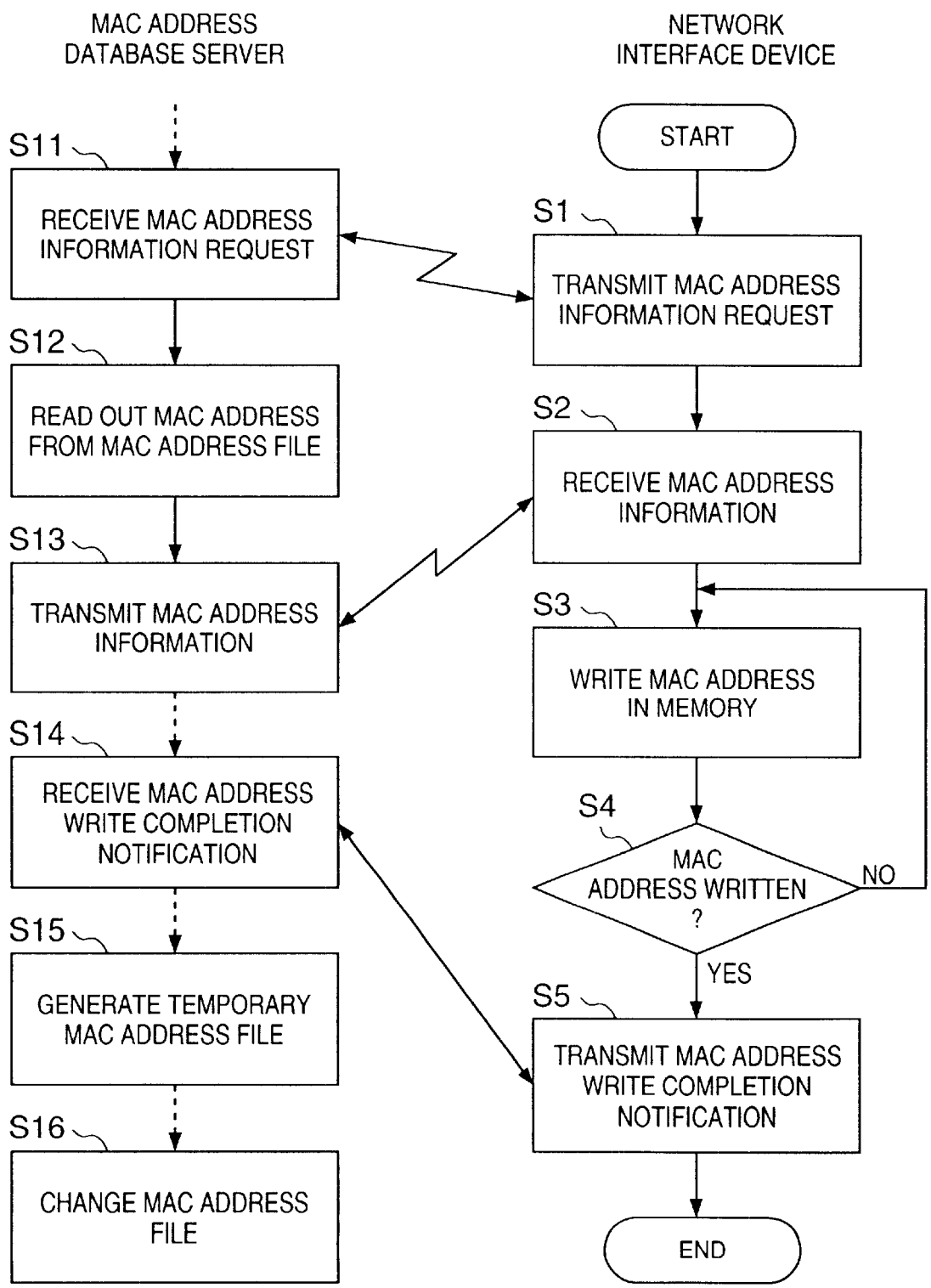
FIG. 2 is a flow chart showing processing procedures executed by a network interface device and MAC address database server.

FIG. 2 is a flow chart showing processing procedures executed by the network interface device 5 and server 4. This flow chart further shows information transmission/reception procedures executed between the network interface device 5 and server 4. An MAC address assignment management method according to the first embodiment will be explained with reference to FIG. 2.

After manufacturing, the network interface device 5 having been inspected issues an MAC address information supply request to the server 4 via a network or development communication port (step S1). The server 4 having received the request (step S11) reads out one MAC address in accordance with a predetermined sequence from the MAC address file 1 stored in the internal storage medium (step S12), and transmits the readout MAC address to the network interface device 5 (step S13). The network interface device 5 writes the received MAC address (step S2) in an internal memory, e.g., flash ROM (step S3), confirms completion of the write (step S4), and transmits a write completion notification to the server 4 (step S5). The server 4 having received the write completion notification from the network interface device 5 (step S14) reads out all remaining MAC addresses from the MAC address file 1 except for the readout MAC address, and writes them in the temporary MAC address file 2 (step S15). Note that in second and subsequent writes when the temporary MAC address file 2 has already stored data, data are rewritten. The server 4 deletes from the MAC address file 1 only the MAC address read out to the network interface device 5 (step S16).

At this time, the temporary MAC address file 2 and MAC address file 1 store the same MAC addresses. That is, every time processing shown in FIG. 2 is executed, the temporary MAC address file 2 is rewritten, and always stores the same MAC addresses as those of the MAC address file 1.

If the server 4 determines that the MAC address file 1 is damaged, the server 4 copies MAC addresses stored in the temporary MAC address file 2 to the MAC address file 1. In the first embodiment, whether the MAC address file 1 is damaged is determined based on whether MAC addresses can be read out. Note, the determination whether or not MAC address file 1 is damaged is not limited to perform when reading out of MAC addresses, the determination may be performed at an arbitrary time, such as, a time when rewriting of MAC addresses, a predetermined time and etc.

Accordingly, even when the MAC address file 1 disables any read owing to any reason, the temporary MAC address file 2, which stores MAC addresses, can be copied to the MAC address file 1 to easily recover the MAC address file 1. It is thought that damage of MAC address file 1 tends to occur when rewriting of MAC addresses. In the first embodiment, because of generating copies of all MAC addresses except MAC addresses used before rewriting, if MAC address file 1 is damaged, double use of MAC address can be prevented and MAC address can be recovered safely.

Second Embodiment

The second embodiment will be described.

The arrangement of the second embodiment is the same as that of the first embodiment. In the second embodiment, the same reference numerals as in the first embodiment denote the same parts, and a description thereof will be omitted.

FIG. 4 is a view showing a network interface device 5, MAC address database server 4, and the like according to the second embodiment of the present invention.

In the second embodiment, an external storage device 7 is connected to the server 4 via a network or a cable. The second embodiment is different from the first embodiment in that a temporary MAC address file 2 is stored in not the server 4 but the external storage device 7.

Similar to the first embodiment, when the server 4 receives,from the network interface device 5 a notification representing that an MAC address has been written in an internal memory (step S14), the server 4 reads out all remaining MAC addresses from an MAC address file 1 except for the readout MAC address, and writes or rewrites them in the temporary MAC address file 2 in the external storage device 7 (step S15).

In this manner, the external storage device 7 stores the temporary MAC address file 2. Even if a storage medium in the server 4 fails, the temporary MAC address file 2 is still stored in the external storage device 7 to reliably recover the MAC address file 1.

The present invention may be applied to a system constituted by a plurality of devices or an apparatus comprising a single device.

The present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magneto optical disk, CD-ROM, CD-R, magnetic tape, nonvolatile memory card, ROM, or the like can be used.

The functions of the above-described embodiments are realized not only when the readout program codes are executed by the computer but also when the OS running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the above embodiments, when the MAC address management apparatus comprises a storage means for storing an MAC address file storing a plurality of MAC addresses and a temporary MAC address file, the apparatus reads out one MAC address from the MAC address file and transmits the MAC address to a network interface device in assigning an MAC address to the network interface device to be connected to a network. When the apparatus receives an MAC address write completion notification from the network interface device, the apparatus rewrites, in the temporary MAC address file, all remaining MAC addresses of the MAC address file except for the MAC address controlled to be transmitted to the network interface device, and deletes from the MAC address file the MAC address transmitted to the network interface device. This can prevent double use of the MAC address to safely, reliably assign the MAC address to the network interface device.

According to above embodiments, when the MAC address management apparatus comprises a storage means for storing an MAC address file storing a plurality of MAC addresses, and stores a temporary MAC address file in an external storage device, the apparatus reads out one MAC address from the MAC address file and transmits the MAC address to a network interface device in assigning an MAC address to the network interface device to be connected to a network. When the apparatus receives an MAC address write completion notification from the network interface device, the apparatus rewrites, in the temporary MAC address file stored in the external storage device, all remaining MAC addresses of the MAC address file except for the MAC address transmitted to the network interface device, and deletes from the MAC address file the MAC address transmitted to the network interface device. This can safely, reliably assign the MAC address to the network interface device. Moreover, the temporary MAC address file is stored in the external storage device. Thus, even when the MAC address file is damaged, the temporary MAC address file is still stored.

If the MAC address management apparatus determines that an abnormality occurs in the MAC address file, data stored in the temporary MAC address file of the external storage device are copied to the MAC address file. Even if the MAC address file is damaged owing to any reason, MAC addresses can be safely, reliably assigned using the temporary MAC address file.

As many apparently widely different embodiments of the present invention can be made without departing from the spirit and scope thereof, it is to be understood that the invention is not limited to the specific embodiments thereof except as defined in the appended claims.

What is claimed is:

1. An MAC address management apparatus for assigning an MAC address serving as an identification number unique to a network interface device to the network interface device to be connected to a network, comprising:

MAC address storage means for storing an MAC address file and a temporary MAC address file, the MAC address file comprising a plurality of MAC addresses;

transmission means for reading out one MAC address from the MAC address file and transmitting the MAC address to the network interface device in order to assign an MAC address to the network interface device;

reception means for receiving an MAC address write completion notification indicating that the transmitted MAC address has been assigned to the network interface device;

rewrite means for rewriting, in the temporary MAC address file, MAC addresses of the MAC address file except for the transmitted MAC address when said reception means receives the MAC address write completion notification; and delete means for deleting the transmitted MAC address from the MAC address file after said rewrite means rewrites the MAC addresses in the temporary MAC address file.

2. The apparatus according to claim 1, further comprising copy means for copying data stored in the temporary MAC address file to the MAC address file when an abnormality is determined to occur in the MAC address file.

3. An MAC address management apparatus for assigning an MAC address serving as an identification number unique to a network interface device to the network interface device to be connected to a network, comprising:

MAC address storage means for storing an MAC address file comprising a plurality of MAC addresses;

external storage means for controlling to store a temporary MAC address file in an external storage device connected to said MAC address management apparatus;

transmission means for reading out one MAC address from the MAC address file and transmitting the MAC address to the network interface device in order to assign an MAC address to the network interface device;

reception means for receiving an MAC address write completion notification indicating that the transmitted MAC address has been assigned to the network interface device;

rewrite means for controlling to rewrite, in the temporary MAC address file of the external storage device, MAC addresses of the MAC address file except for the transmitted MAC address when said reception means receives the MAC address write completion notification; and delete means for deleting the transmitted MAC address from the MAC address file after said rewrite means controls to rewrite the MAC addresses in the temporary MAC address file.

4. The apparatus according to claim 3, further comprising copy means for copying data stored in the temporary MAC address file of the external storage device to the MAC address file when an abnormality is determined to occur in the MAC address file.

5. An MAC address management system comprising a network interface device to be connected to a network, and an MAC address management apparatus for assigning an MAC address serving as an identification number unique to the network interface device, said MAC address management apparatus having:

MAC address storage means for storing an MAC address file and a temporary MAC address file, the MAC address file comprising a plurality of MAC addresses;

transmission means for reading out one MAC address from the MAC address file and transmitting the MAC address to said network interface device in order to assign an MAC address to said network interface device;

reception means for receiving an MAC address write completion notification indicating that the transmitted MAC address has been assigned to said network interface device;

rewrite means for rewriting, in the temporary MAC address file, MAC addresses of the MAC address file except for the transmitted MAC address when said reception means receives the MAC address write completion notification; and delete means for deleting the transmitted MAC address from the MAC address file after said rewrite means rewrites the MAC address in the temporary MAC address file, and said network interface device having:

MAC address reception means for receiving the assigned MAC address from said MAC address management apparatus;

write/storage means for writing and storing the MAC address; and write completion notification transmission means for transmitting the MAC address write completion notification upon completion of a write of the MAC address.

6. An MAC address management system comprising a network interface device to be connected to a network, and an MAC address management apparatus for assigning an MAC address serving as an identification number unique to the network interface device, said MAC address management apparatus having:

MAC address storage means for storing an MAC address file comprising a plurality of MAC addresses;

external storage means for controlling to store a temporary MAC address file in an external storage device connected to said MAC address management apparatus;

transmission means for reading out one MAC address from the MAC address file and transmitting the MAC address to the network interface device in order to assign an MAC address to said network interface device;

reception means for receiving an MAC address write completion notification indicating that the transmitted MAC address has been assigned to said network interface device;

rewrite means for controlling to rewrite, in the temporary MAC address file of the external storage device, MAC addresses of the MAC address file except for the transmitted MAC address when said reception means receives the MAC address write completion notification; and delete means for deleting the transmitted MAC address from the MAC address file after said rewrite means controls to rewrite the MAC addresses in the temporary MAC address file, and said network interface device having:

MAC address reception means for receiving the assigned MAC address from said MAC address management apparatus;

write/storage means for writing and storing the MAC address; and write completion notification transmission means for transmitting the MAC address write completion notification upon completion of a write of the MAC address.

7. An MAC address management method applied to an MAC address management apparatus having storage means for storing an MAC address file storing a plurality of MAC addresses and a temporary MAC address file, comprising:

the transmission step of controlling to read out one MAC address from the MAC address file and transmit the MAC address to a network interface device in order to assign an MAC address to the network interface device to be connected to a network;

the reception step of controlling to receive an MAC address write completion notification indicating that the transmitted MAC address has been assigned to the network interface device;

the rewrite step of controlling to rewrite, in the temporary MAC address file, MAC addresses of the MAC address file except for the transmitted MAC address when said reception step receives the MAC address write completion notification; and the delete step of controlling to delete the transmitted MAC address from the MAC address file after said rewrite step rewrites the MAC addresses in the temporary MAC address file.

8. The method according to claim 7, further comprising the copy step of controlling to copy data stored in the temporary MAC address file to the MAC address file when an abnormality is determined to occur in the MAC address file.

9. An MAC address management method applied to an MAC address management apparatus having storage means for storing an MAC address file comprising a plurality of MAC addresses, comprising:

the transmission step of controlling to read out one MAC address from the MAC address file and transmit the MAC address to a network interface device in order to assign an MAC address to the network interface device to be connected to a network;

the reception step of controlling to receive an MAC address write completion notification indicating that the transmitted MAC address has been assigned to the network interface device;

the rewrite step of controlling to rewrite MAC addresses of the MAC address file except for the transmitted MAC address, in a temporary MAC address file stored in an external storage device connected to the MAC address management apparatus, when said reception step receives the MAC address write completion notification; and the delete step of controlling to delete the transmitted MAC address from the MAC address file after said rewrite step rewrites the MAC addresses in the temporary MAC address file.

10. The method according to claim 9, further comprising the copy step of copying data stored in the temporary MAC address file of the external storage device to the MAC address file when an abnormality is determined to occur in the MAC address file.

11. A computer-readable storage medium which stores an MAC address management program for controlling an MAC address management apparatus having storage means for storing an MAC address file storing a plurality of MAC addresses and a temporary MAC address file, comprising codes of:

the transmission step of controlling to read out one MAC address from the MAC address file and transmit the MAC address to a network interface device in order to assign an MAC address to the network interface device to be connected to a network;

the reception step of controlling to receive an MAC address write completion notification indicating that the transmitted MAC address has been assigned to the network interface device;

the rewrite step of controlling to rewrite, in the temporary MAC address file, MAC addresses of the MAC address file except for the transmitted MAC address, when said reception step receives the MAC address write completion notification; and the delete step of controlling to delete the transmitted MAC address from the MAC address file after said rewrite step rewrites the MAC addresses in the temporary MAC address file.

12. The medium according to claim 11, further comprising a code of the copy step of controlling to copy data stored in the temporary MAC address file to the MAC address file when an abnormality is determined to occur in the MAC address file.

13. A computer-readable storage medium which stores an MAC address management program for controlling an MAC address management apparatus having storage means for storing an MAC address file comprising a plurality of MAC addresses, comprising codes of:

the transmission step of controlling to read out one MAC address from the MAC address file and transmit the MAC address to a network interface device in order to assign an MAC address to the network interface device to be connected to a network;

the reception step of controlling to receive an MAC address write completion notification indicating that the transmitted MAC address has been assigned to the network interface device;

the rewrite step of controlling to rewrite MAC addresses of the MAC address file except for the transmitted MAC address, in a temporary MAC address file stored in an external storage device connected to the MAC address management apparatus, when said reception step receives the MAC address write completion notification; and the delete step of controlling to delete the transmitted MAC address from the MAC address file after said rewrite step controls to rewrite the MAC addresses in the temporary MAC address file.

14. The medium according to claim 13, further comprising a code of the copy step of copying data stored in the temporary MAC address file of the external storage device to the MAC address file when an abnormality is determined to occur in the MAC address file.

* * * * *

UNITED STATES PATENT AND TRADEMARK OFFICE
CERTIFICATE OF CORRECTION

PATENT NO. : 6,609,152 B1
DATED : August 19, 2003
INVENTOR(S) : Ono

It is certified that error appears in the above-identified patent and that said Letters Patent is hereby corrected as shown below:

Column 1,
Line 29, "written" should read -- having been written --.

Column 2,
Line 15, "when" should read -- when it is determined that --;
Line 16, "is determined to occur" should read -- occurs --; and
Line 44, "an abnormality is determined to occur" should read -- it is determined that an abnormality occurs --.

Column 3,
Line 66, "an abnormality is determined to occur" should read -- it is determined that an abnormality occurs --.

Column 4,
Line 23, "an abnormality is determined to occur" should read -- it is determined that an abnormality occurs --;
Line 47, "an abnormality is determined to" should read -- it is determined that an abnormality --; and
Line 48, "occur" should read -- occurs --.

Column 5,
Line 5, "an" should read -- it is determined that an --; and
Line 6, "is determined to occur" should read -- occurs --

Column 6,
Line 34, "perform" should read -- be performed --; and
Line 65, "receives,from" should read -- receives from --.

UNITED STATES PATENT AND TRADEMARK OFFICE
CERTIFICATE OF CORRECTION

PATENT NO.    : 6,609,152 B1
DATED         : August 19, 2003
INVENTOR(S)   : Ono It is certified that error appears in the above-identified patent and that said Letters Patent is hereby corrected as shown below:

Column 7,
Line 33, "readout" should read -- read out --.

Signed and Sealed this

Twenty-fourth Day of August, 2004

JON W. DUDAS
*Director of the United States Patent and Trademark Office*